United States Patent
Maria

(10) Patent No.: US 11,405,321 B2
(45) Date of Patent: Aug. 2, 2022

(54) 5G FILTERS FOR VIRTUAL NETWORK FUNCTIONS

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 78 days.

(21) Appl. No.: 16/520,103

(22) Filed: Jul. 23, 2019

(65) Prior Publication Data

US 2021/0029042 A1    Jan. 28, 2021

(51) Int. Cl.
| | |
|---|---|
| *H04L 47/20* | (2022.01) |
| *H04L 9/40* | (2022.01) |
| *H04L 47/32* | (2022.01) |
| *H04L 41/0631* | (2022.01) |
| *H04L 43/0882* | (2022.01) |
| *H04L 43/16* | (2022.01) |
| *H04L 67/12* | (2022.01) |

(52) U.S. Cl.
CPC .......... *H04L 47/20* (2013.01); *H04L 41/0631* (2013.01); *H04L 43/0882* (2013.01); *H04L 43/16* (2013.01); *H04L 47/32* (2013.01); *H04L 63/20* (2013.01); *H04L 67/12* (2013.01)

(58) Field of Classification Search
CPC ..... H04L 47/20; H04L 47/32; H04L 43/0882; H04L 43/16; H04L 41/0631; H04L 63/20; H04L 67/12
See application file for complete search history.

(56) References Cited

U.S. PATENT DOCUMENTS

| | | | |
|---|---|---|---|
| 9,578,664 B1 * | 2/2017 | Paczkowski | H04W 76/12 |
| 10,715,493 B1 * | 7/2020 | Moore | H04L 12/66 |
| 2016/0294870 A1 * | 10/2016 | Banerjee | H04L 43/0876 |
| 2017/0086118 A1 * | 3/2017 | Vrzic | H04W 36/26 |
| 2017/0295082 A1 * | 10/2017 | Wu | H04L 67/10 |
| 2018/0062943 A1 * | 3/2018 | Djukic | H04L 41/5009 |
| 2018/0159880 A1 * | 6/2018 | Sood | H04L 41/28 |
| 2020/0137121 A1 * | 4/2020 | Rogers | H04L 63/0209 |

* cited by examiner

*Primary Examiner* — Saumit Shah
(74) *Attorney, Agent, or Firm* — Guntin & Gust, PLC; Mark Wilinski

(57) ABSTRACT

Security filters may protect communication and data traversing and communicating between programs in a hosted container system. In addition, an orchestration system may specifically address the creation and behavior of security filters that manage the behavior of virtual network functions residing in containers.

20 Claims, 6 Drawing Sheets

5G FILTERS FOR VIRTUAL NETWORK FUNCTIONS

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual central processing units (vCPUs), and network interfaces or network interface cards (NICs). Cloud systems are complex multi-layer hardware and software systems that consist of multiple components, interacting with each other through complicated mechanisms. The operation and management of a large-scale cloud is highly susceptible to anomalies, attacks, and faults. Identifying the root causes is often difficult to diagnose even with the skilled operators. This disclosure is directed to addressing issues in the existing technology.

SUMMARY

Disclosed herein are security filters that may protect communication and data traversing and communicating between programs in a hosted container system. In addition, an orchestration system may specifically address the creation and behavior of security filters that manage the behavior of VNFs residing in containers or the like.

In an example, an apparatus may include a processor and a memory coupled with the processor that effectuates operations. The operations may include obtaining an indication (e.g., an alert message) that a virtual network function of a plurality of virtual network functions may be created on a worker node; based on the indication, updating a filter for the worker node for the virtual network function, wherein the filter may filter data traffic from or to one or more virtual network functions within the worker node; based on the virtual network function, obtaining security rules for data traffic to or from the virtual network function; and based on the security rules for data traffic associated with the virtual network function, denying, by the filter, a packet of the data traffic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION 5G gateway images (e.g., VNFs) may be orchestrated by Kubernetes. Images may be moved from Pods to worker nodes in Kubernetes clusters. Virtual images (e.g., VNFs) may be considered programs hosted on containers which are orchestrated by Kubernetes. Conventional filters and firewalls do not address security exposures created by VNFs hosted in this architecture particularly as they communicate with each other.

Disclosed herein is subject matter for managing user plane and control plane filters that inspect, detect, or prevent malicious code operating between VNF images. Conventional systems do not address security filters between images that need to be implemented and orchestrated. Particularly when these images are VNF programs running on containers. A centralized control plane EPC facility may orchestrate the creation, behavior, alerting, or reporting of the security filters for these images.

Figure 1:
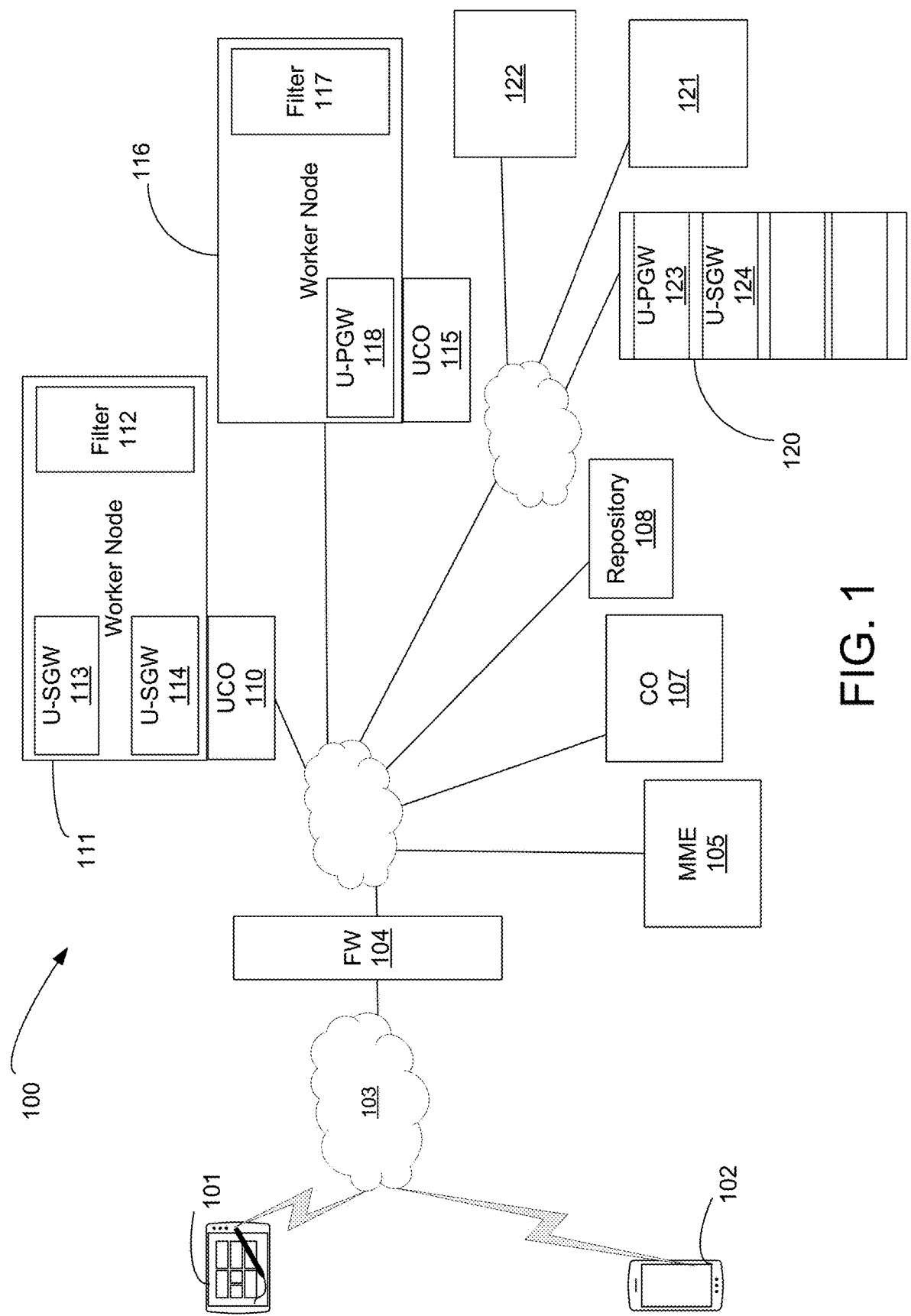
FIG. 1 illustrates an exemplary system for implementing security filters for virtual network functions.

FIG. 1 illustrates an exemplary system for implementing 5G filters for virtual network functions (VNFs), as disclosed herein. Device 101, device 102, or firewall 104 may be communicatively connected with each other through network 103. Network 103 may be the internet or the like network. System 100 may include firewall 104 and other devices that make up a cloud network for virtual network functions (VNFs) or virtual machines (VMs), among other functions or devices. For example, system 100 may include communicatively connected controller 106, mobility management entity 105, centralized orchestrator (CO) 107, repository 108, worker node 111, worker node 116, block 120, block 121, or block 122, among other things.

With continued reference to FIG. 1, worker node 111 (or worker node 116) may be a node in Kubernetes. As shown, worker node 111 may include filter 112, user plane CO (UCO) 110, or VNFs, such as virtual gateways that include user plane serving gateway (U-SGW) 113 or U-SGW 114. Worker node 116 may include filter 117, UCO 115, or VNFs, such as virtual gateways that include user plane packet data network gateway (U-PGW) 118.

Block 120 (or block 121 or block 122) may be a container that includes Pods, such as a pod for U-PGW 123 or U-SGW 124. U-SGW 113, U-SGW 114, or U-PGW 118 may have previously been Pods that were from any one of block 120 through block 122. A Pod may model an application-specific logical host, in which it may include one or more application containers which are relatively tightly coupled. Worker nodes may run services that may include Docker, kubelet, or kube-proxy.

Figure 2:
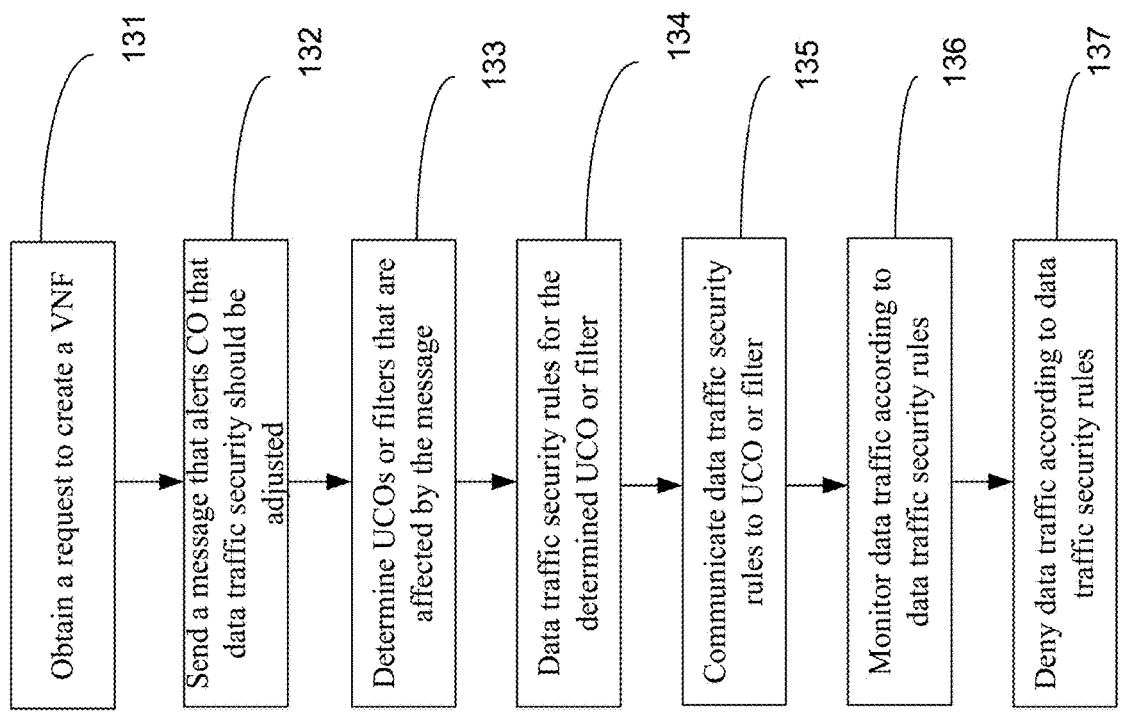
FIG. 2 illustrate an exemplar method for implementing security filters for virtual network functions.

FIG. 2 illustrate an exemplary method for implementing 5G filters for VNFs. At step 131, mobility management entity (MME) 105 may obtain (e.g., receive) a request to create a VNF, such as U-SGW 114. This request may be based on a condition, such as U-SGW 113 reaching a threshold amount of packet processing or other usage. At step 132, responsive to step 131, MME 105 may send a message that alerts CO 107 that data traffic security (e.g., security rules) should be adjusted (e.g., create or update filter 112 or UCO 110). CO 107 may be located on an evolved packet core and operate at the control plane level. U-SGW 114 may be an image that is obtained from block 120 or the like and installed onto worker node 111.

At step 133, based on the message (e.g., an alert) of step 132, CO 107 may determine UCOs or filters that are affected by the message of step 132. For example, the message may indicate that data traffic security should be adjusted by UCO 110 or filter 112 of worker node 111. In an example scenario, worker node 111 may only be authorized to communicate with worker node 116 and therefore data traffic security for UCO 115 or filter 117 may also be adjusted, which may minimize the amount of unnecessary traffic traversing across the network or otherwise being processed.

At step 134, based on the determining of step 133, CO 107 may obtain data traffic security rules for the determined UCO 110 or filter 112 that are associated with worker node 111. The data traffic security rules may be obtained from repository 108. Repository 108 may be updated periodically based on any number of factors, which may include detected intrusions by remote UCOs (e.g., UCO 115) that report back to CO 107. For example, repository 108 may be updated when it is determined that throughput or processing associated with an application reaches a threshold level that is determined to negatively impact performance.

At step 135, based on the message of step 132, CO 107 may communicate with (which may include create or update) UCO 110 or filter 112. CO 107 may instruct UCO 110 to monitor the communication between a newly created VNF and other VNFs. For example, when a container image (e.g., U-SGW 114 from block 120) is assigned to worker node 111, UCO 110 is notified and data traffic security rules may be provided to UCO 110 or filter 112 to allow or deny types of data traffic (e.g., packets), data traffic to or from one or more entities (e.g., VNFs or worker nodes), or other factors. In addition, data traffic may be allowed in a first direction (e.g., U-SGW 113 to U-SGW 114), but not in a second direction (e.g., U-SGW 114 to U-SGW 113) based on the data traffic security rules. UCO 110 may be used to monitor and deny data traffic of VNFs between worker nodes, such as data traffic between U-PGW 118 of worker node 116 and U-SGW 114 of worker node 111. Filter 112 may be used to monitor traffic of VNFs within a worker node (e.g., worker node 111), such as data traffic between U-SGW 113 and U-SGW 114.

At step 136, based on the communicated data traffic security rules of step 135, filter 112 may determine that data traffic between U-SGW 113 and U-SGW of 114, for example, is not allowed. At step 137, data traffic based on the determination of step 136 may be subsequently denied.

With continued reference to FIG. 1, it is contemplated herein that the data traffic security rules may correspond to a particular image. For example, U-PGW 123 may be an image that is installed on a plurality of worker nodes. For each worker node that U-PGW 123 is installed, repository 108 may be updated with a default data security rule, which may include denying types of data traffic, data traffic from particular devices, or the like.

For additional perspective, in a cloud network there are several packet exchanges that happen behind the firewall, in which conventional firewalls are unaware. Filter 112 (and filter 117) may monitor communication between programs (e.g., worker node 111 or U-SGW 114 and U-SGW 113) that firewalls usually do not monitor. Filter 112 and UCO 110 may be created on demand, therefore when worker nodes are created and deleted, the disclosed subject matter allows for the dynamic creation and application of data traffic security through these filters or UCOs. The disclosed subject matter may be particularly beneficial in a 5G network. In an example, there may be a virtual gateway (e.g., SGW or PGW) for every user (e.g., every car in a connected car environment). In this example, CO 107 may manage this environment in which they create dynamic data traffic security entities (e.g., UCOs or filter), tear the data traffic security entities down, transmit rules for data traffic security, or the like.

The functions of FIG. 1 may be in one device or distributed over multiple devices, which may be physical devices or virtual machines, or the like. Although examples are given in which system 100 is in a cloud network, it is contemplated that similar architectures or functions may be in device 101 (e.g., a connected car or mobile phone). Filter 112 may be an access control list. Filter 112 may be considered a container filter and reside in worker nodes (WN) hosted in Kubernetes Clusters.

VNFs residing in each container may forward a traffic to the UCO for inspection. UCO 110 may apply security rules to the traffic inspected. If a security exception is detected, CO 107 may be notified. CO 107 may notify other UCOs (e.g., UCO 115) and modify data traffic security as appropriate. CO 107 may communicate and manage the disclosed system based on various logs, such as security incident and event management (SIEM) logs. CO 107 may have a provisioning engine that allows customers to edit UCO filtering rules.

A container may be considered a "package" or applications. The applications have been removed from their normal executable environment. The "images" (or programs) in a container are moved (or "orchestrated") from the container to worker nodes. So, the worker nodes may execute the programs which are "images" in containers. For example, the product "Docker" provides "containers." These "containers" have programs (executable code). The images (or programs) in these containers may be moved to a worker node for execution. A worker node may be a server hosting multiple virtual machines. For example, a Dell Server running VMWare. The execution of images may take place in virtual machines.

The disclosed subject matter allows for security inspection and filtering in user plane network elements. This type of filtering is enabled based on its use in the CUPS (control user plane separation) architecture. The disclosed subject matter allows the enterprise to filter services acting upon images and containers in a CUPS environment in 5G.

Figure 3:
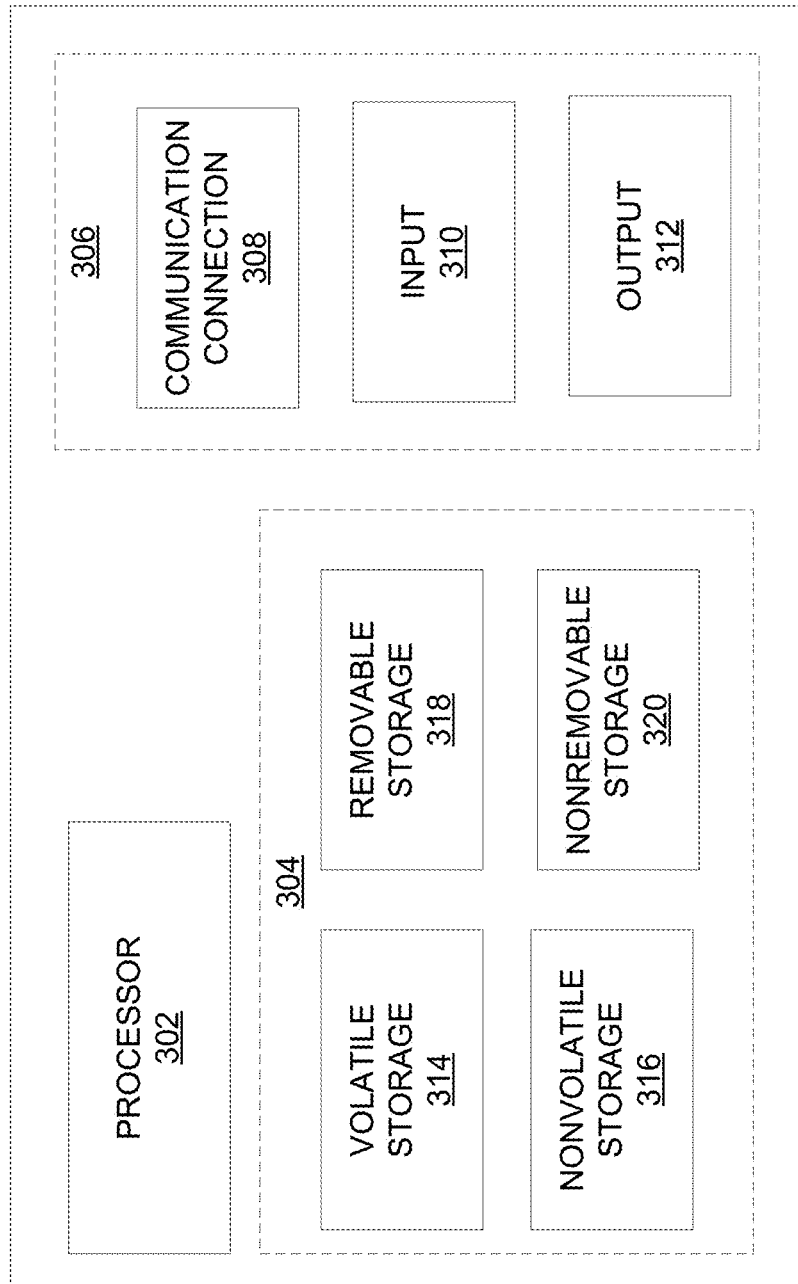
FIG. 3 illustrates a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
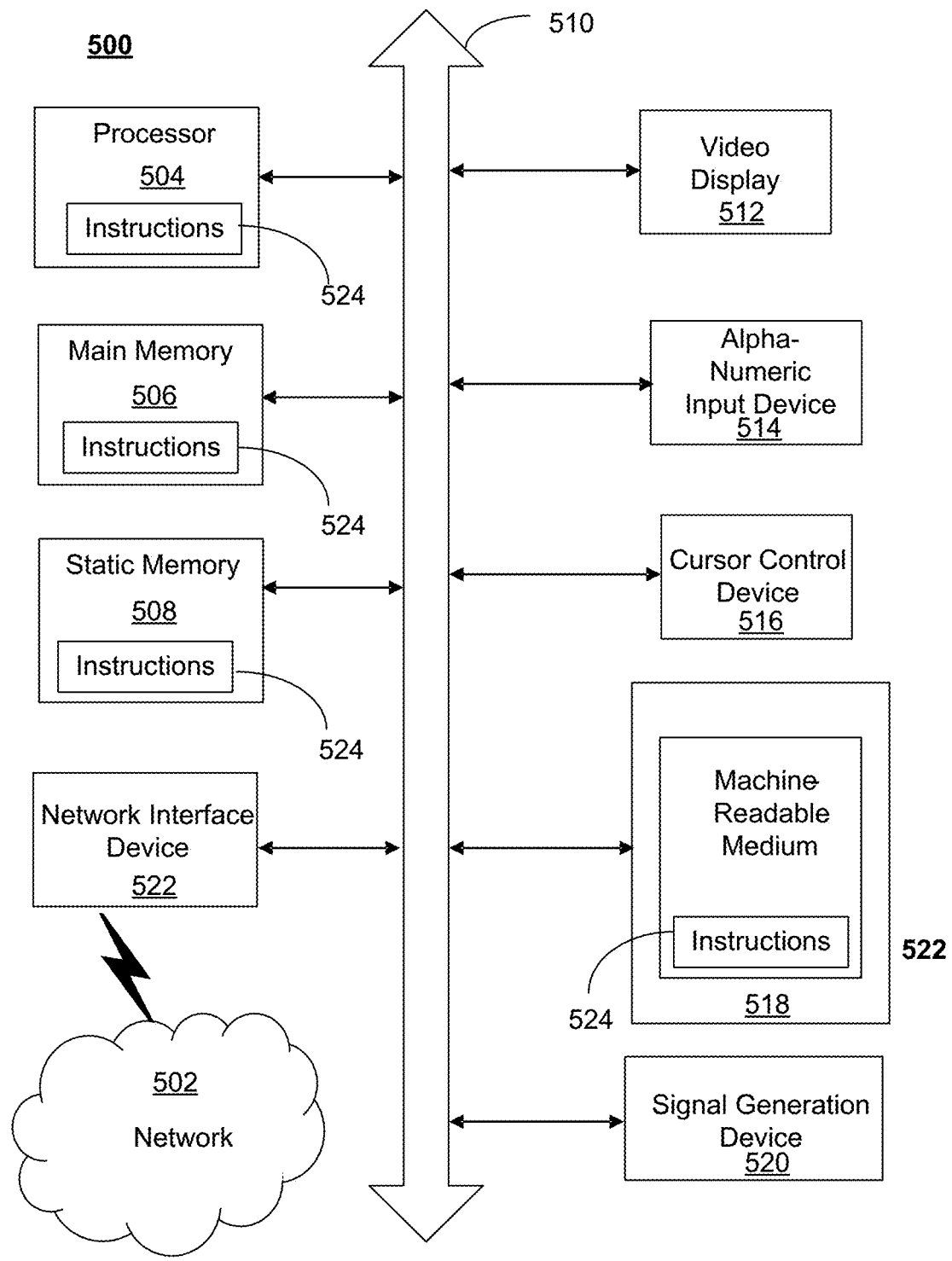
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, device 101, device 102, firewall 104, CO 107, MME 105, or other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 5A:
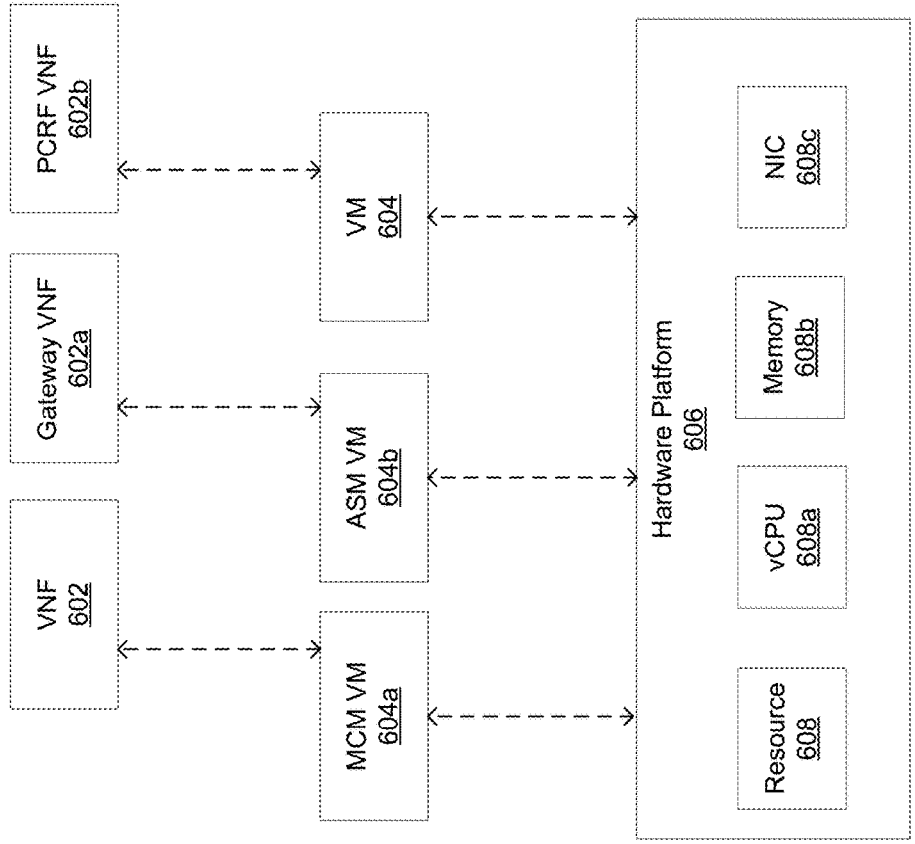
FIG. 5A is a representation of an exemplary network.

FIG. 5A is a representation of an exemplary network 600. Network 600 (e.g., network of FIG. 1) may include an SDN. For example, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 5A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 5A illustrates a management control module (MCM) VM 604a and an advanced services module (ASM) VM 604b. Additionally or alternatively, VMs 604 may include other types of VMs, such as a DEP VM (not shown). Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 5B:
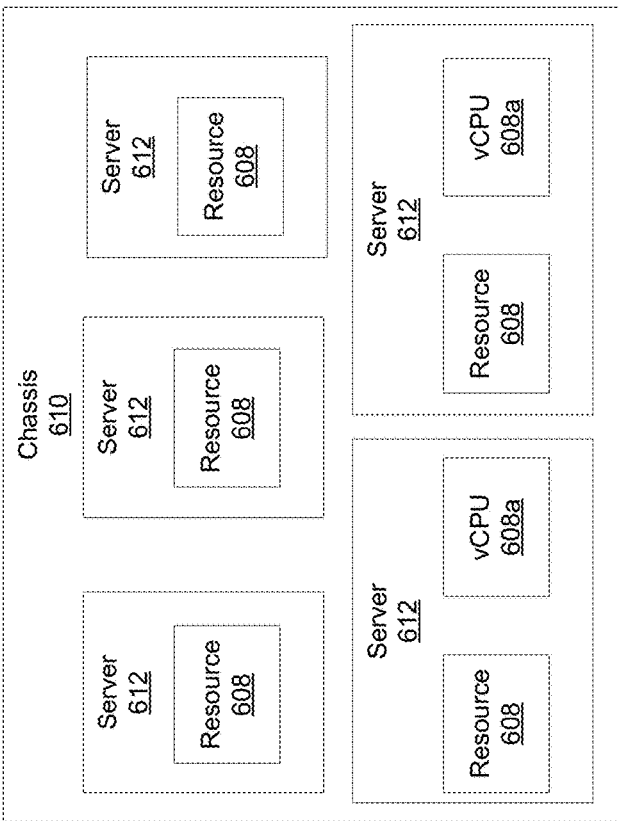
FIG. 5B is a representation of an exemplary hardware platform for a network.
Figure 5B:
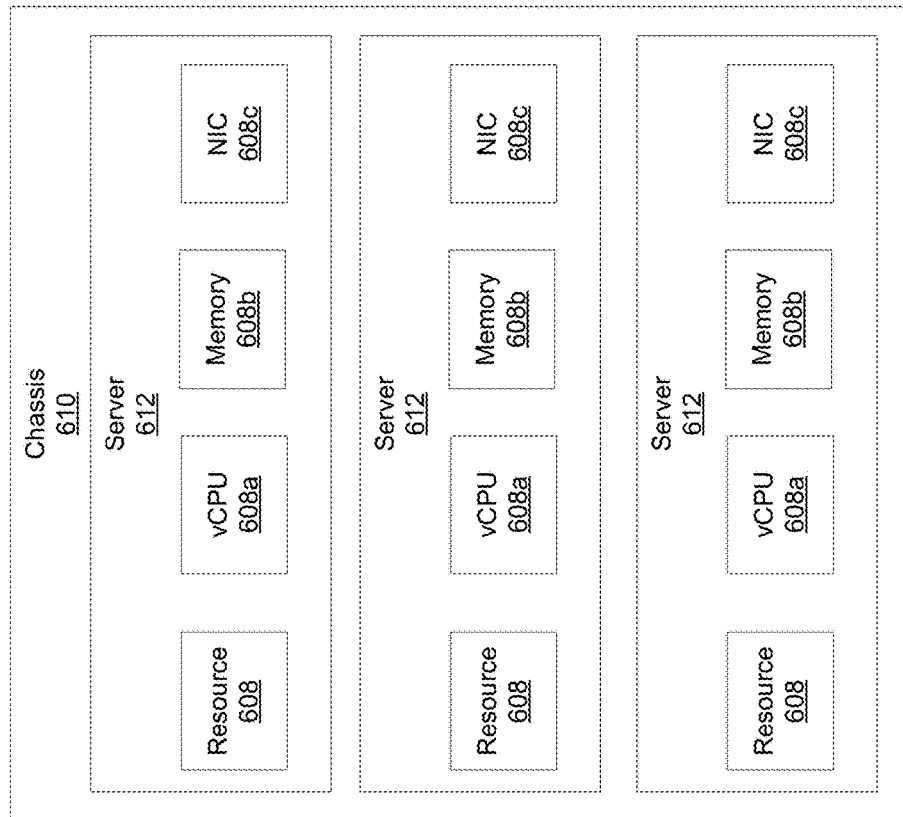

While FIG. 5A illustrates resources 608 as collectively contained in hardware platform 606, the configuration of hardware platform 606 may isolate, for example, certain memory 608c from other memory 608c. FIG. 5B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 5B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have enough resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management. 5G architecture standards define the employment of user plane Virtual Network Functions (VNFs). These VNFs may run in localized enterprises as U-SGW's, U-PGWs, etc. These gateways may be considered programs running on containers (like Docker). Disclosed herein are ways to use network firewalls or filters to protect the 5G network.

While examples of a telecommunications system in which 5G filters for VNFs can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—5G filters for VNFs—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for managing or operating filters or UCOs for virtual network functions. A method, system, computer readable storage medium, or apparatus may provide for obtaining a request to create a first virtual network function of a plurality of virtual network functions on a first worker node; based on the request, updating a filter (also referred herein as a security filter) for the first worker node for the first virtual network function, wherein the filter filters data traffic from or to the plurality virtual network functions within the first worker node, wherein the first worker node is a virtual machine; based on the virtual network function, obtaining security rules for data traffic associated with the first virtual network function; and based on the security rules for data traffic associated with the first virtual network function, denying, by the filter, a first packet of the data traffic. A method, system, computer readable storage medium, or apparatus may provide for obtaining an alert associated with the creation of a first virtual network function of a plurality of virtual network functions on a first worker node; based on the alert, updating or creating a filter for the first worker node for the first virtual network function, wherein the filter filters data traffic from or to the plurality virtual network functions within the first worker node, wherein the first worker node is a virtual machine; based on the virtual network function, obtaining security rules for data traffic associated with the first virtual network function; and based on the security rules for data traffic associated with the first virtual network function, providing instructions to the filter to deny or allow a first packet of the data traffic. The first virtual network function may include a U-SGW, U-PGW, or the like. The worker node may be associated with a connected car (e.g., autonomous vehicle). The method, system, computer readable storage medium, or apparatus may detect that data traffic of a first type for the first virtual network function reaches a first threshold; and based on the detecting that the data traffic of the first type reaches the first threshold, sending a message to update security rules for data traffic of a second virtual network function. The second virtual network function may be based on an image (e.g., U-SGW 124) of the first virtual network function or the second virtual network function may operate in a second worker node that is different than the first worker node. The security rules may be based on type of device information, time of a communication session, or a threshold number of VNFs in a worker node (or group of worker nodes), among other things. It is contemplated that UCOs may have similar operation as filters except between worker nodes. All combinations in this paragraph (including the removal or addition of steps) are contemplated in a manner that is consistent with the other portions of the detailed description.

What is claimed:

1. An apparatus comprising:
   a processor; and
   a memory coupled with the processor, the memory storing executable instructions that when executed by the processor cause the processor to effectuate operations comprising:
      obtaining a request to create a first virtual network function of a plurality of virtual network functions on a first worker node;
      based on the request, updating or creating a filter for the first worker node for the first virtual network function, wherein the filter filters data traffic from or to the plurality of virtual network functions within the first worker node, and wherein the first worker node is a virtual machine;
      obtaining security rules for data traffic associated with the first virtual network function, wherein the security rules are updated periodically based on factors that comprise:
         intrusions detected by a remote user plane orchestrator or remote filters, and
         throughput or processing associated with an application reaches a threshold level that is determined to negatively impact performance; and
      based on the security rules:
         denying, by the filter, first data traffic of the data traffic based on an identification of the first data traffic as being a packet,
         allowing, by the filter, second data traffic of the data traffic based on an identification of the second data traffic as being of a type that is different from a packet,
         denying, by the filter, third data traffic of the data traffic based on the third data traffic being from a second virtual network function of the plurality of virtual network functions within the first worker node, and
         allowing, by the filter, fourth data traffic of the data traffic based on the fourth data traffic being destined for the second virtual network function.

2. The apparatus of claim 1, wherein the first virtual network function comprises a serving gateway.

3. The apparatus of claim 1, wherein the first virtual network function comprises a packet data network gateway.

4. The apparatus of claim 1, wherein the first worker node is associated with a connected car.

5. The apparatus of claim 1, the operations further comprising:
 detecting that data traffic of a first type for the first virtual network function reaches a first threshold;
 based on the detecting that the data traffic of the first type reaches the first threshold, generating an alert associated with data traffic security; and
 based on the alert, sending a message to update security rules to restrict traffic for data traffic of a third virtual network function.

6. The apparatus of claim 1, the operations further comprising:
 detecting that data traffic of a first type for the first virtual network function reaches a first threshold; and
 based on the detecting that the data traffic of the first type reaches the first threshold, sending a message to update security rules for data traffic of the second virtual network function, wherein the second virtual network function is based on an image of the first virtual network function.

7. The apparatus of claim 1, the operations further comprising:
 detecting that data traffic of a first type for the first virtual network function reaches a first threshold; and
 based on the detecting that the data traffic of the first type reaches the first threshold, sending a message to update security rules for data traffic of a third virtual network function, wherein the third virtual network function operates in a second worker node.

8. A non-transitory computer readable storage medium storing computer executable instructions that when executed by a computing device cause said computing device to effectuate operations comprising:
 obtaining a request to create a first virtual network function of a plurality of virtual network functions on a first worker node;
 based on the request, updating a filter for the first worker node for the first virtual network function, wherein the filter filters data traffic from or to the plurality of virtual network functions within the first worker node, and wherein the first worker node is a virtual machine;
 obtaining security rules for data traffic associated with the first virtual network function, wherein the security rules are updated periodically based on factors that comprise:
  intrusions detected by a remote user plane orchestrator or remote filters, and
  throughput or processing associated with an application reaches a threshold level that is determined to negatively impact performance; and
 based on the security rules:
  denying, by the filter, first data traffic of the data traffic based on an identification of the first data traffic as being a packet,
  allowing, by the filter, second data traffic of the data traffic based on an identification of the second data traffic as being of a type that is different from a packet,
  denying, by the filter, third data traffic of the data traffic based on the third data traffic being from a second virtual network function of the plurality of virtual network functions within the first worker node,
  allowing, by the filter, fourth data traffic of the data traffic based on the fourth data traffic being destined for the second virtual network function.

9. The non-transitory computer readable storage medium of claim 8, wherein the first virtual network function comprises a serving gateway.

10. The non-transitory computer readable storage medium of claim 8, wherein the first virtual network function comprises a packet data network gateway.

11. The non-transitory computer readable storage medium of claim 8, wherein the first worker node is associated with a connected car.

12. The non-transitory computer readable storage medium of claim 8, the operations further comprising:
 detecting that data traffic of a first type for the first virtual network function reaches a first threshold; and
 based on the detecting that the data traffic of the first type reaches the first threshold, sending a message to update security rules for data traffic of the second virtual network function.

13. The non-transitory computer readable storage medium of claim 8, the operations further comprising:
 detecting that data traffic of a first type for the first virtual network function reaches a first threshold; and
 based on the detecting that the data traffic of the first type reaches the first threshold, sending a message to update security rules for data traffic of a third virtual network function, wherein the third virtual network function is based on an image of the first virtual network function.

14. The non-transitory computer readable storage medium of claim 8, the operations further comprising:
 detecting that data traffic of a first type for the first virtual network function reaches a first threshold; and
 based on the detecting that the data traffic of the first type reaches the first threshold, sending a message to update security rules for data traffic of a third virtual network function, wherein the third virtual network function operates in a second worker node.

15. A method comprising:
 obtaining, by a processor, an alert associated with creation of a first virtual network function of a plurality of virtual network functions on a first worker node;
 based on the alert, updating or creating, by the processor, a filter for the first worker node for the first virtual network function, wherein the filter filters data traffic from or to the of plurality virtual network functions within the first worker node, and wherein the first worker node is a virtual machine; and
 obtaining, by the processor, security rules for data traffic associated with the first virtual network function, wherein the security rules are updated periodically based on factors that comprise:
  intrusions detected by a remote user plane orchestrator or remote filters, and
  throughput or processing associated with an application reaches a threshold level that is determined to negatively impact performance, and
 wherein the security rules:
  allow, by the filter, first data traffic of the data traffic based on an identification of the first data traffic as being a packet,
  deny, by the filter, second data traffic of the data traffic based on an identification of the second data traffic as being of a type that is different from a packet,
  allow, by the filter, third data traffic of the data traffic based on the third data traffic being from a second virtual network function of the plurality of virtual network functions within the first worker node, and deny, by the filter, fourth data traffic of the data traffic based on the fourth data traffic being destined for the second virtual network function.

16. The method of claim 15, wherein the security rules: deny, by the filter, fifth data traffic of the data traffic based on the fifth data traffic being from a third virtual network function that is within a second worker node.

17. The method of claim 16, wherein the security rules: allow, by the filter, sixth data traffic of the data traffic based on the sixth data traffic being destined for the third virtual network function.

18. The method of claim 15, wherein the security rules: allow, by the filter, fifth data traffic of the data traffic based on the fifth data traffic being from a third virtual network function that is within a second worker node.

19. The method of claim 18, wherein the security rules: deny, by the filter, sixth data traffic of the data traffic based on the sixth data traffic being destined for the third virtual network function.

20. The method of claim 19, wherein the security rules:

deny, by the filter, seventh data traffic of the data traffic based on the seventh data traffic being from a fourth virtual network function that is within the second worker node, allow, by the filter, eighth data traffic of the data traffic based on the eight data traffic being destined for the fourth virtual network function, allow, by the filter, ninth data traffic of the data traffic based on the ninth data traffic being from a fifth virtual network function that is within a third worker node, allow, by the filter, tenth data traffic of the data traffic based on the tenth data traffic being destined for the fifth virtual network function, deny, by the filter, eleventh data traffic of the data traffic based on the eleventh data traffic being from a sixth virtual network function that is within the third worker node, and deny, by the filter, twelfth data traffic of the data traffic based on the twelfth data traffic being destined for the sixth virtual network function.

* * * * *